April 29, 1958
G. M. FORD
2,832,900
TRANSIENT OVERVOLTAGE AND SHORT
CIRCUIT PROTECTIVE NETWORK
Filed Feb. 12, 1957
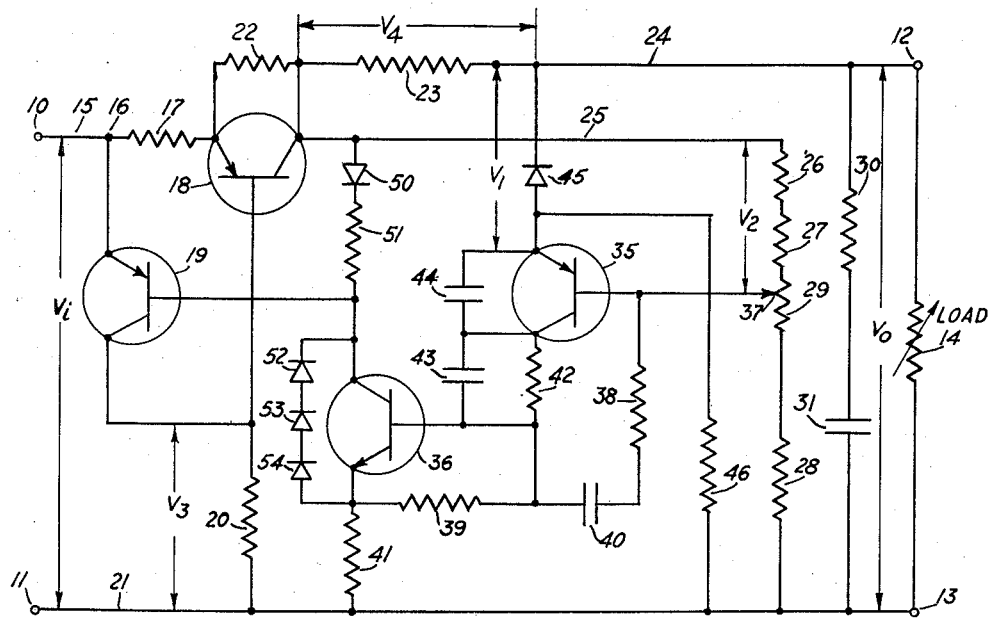
*FIG. 1*
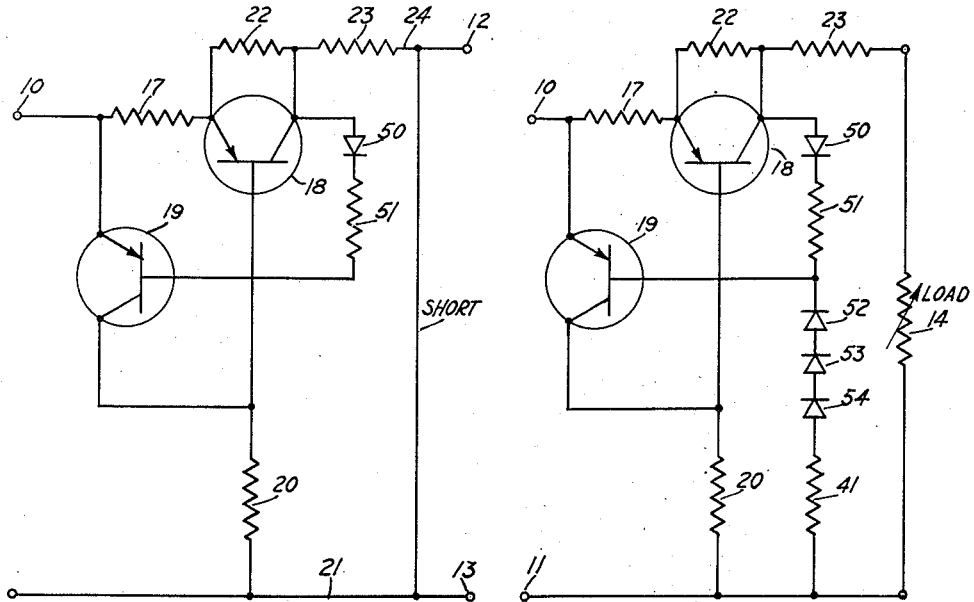
*FIG. 2*          *FIG. 3*
INVENTOR.
GERALD M. FORD
BY
*Schmitt*
*H. H. Losche*
ATTORNEYS

United States Patent Office 2,832,900
Patented Apr. 29, 1958

2,832,900

TRANSIENT OVERVOLTAGE AND SHORT CIRCUIT PROTECTIVE NETWORK

Gerald M. Ford, Kokomo, Ind., assignor to the United States of America as represented by the Secretary of the Navy Application February 12, 1957, Serial No. 639,836

7 Claims. (Cl. 307—93)

(Granted under Title 35, U. S. Code (1952), sec. 266)

The invention described herein may be manufactured and used by or for the Government of the United States of America for governmental purposes without the payment of any royalties thereon or therefor.

This invention relates to a protective network utilized in conjunction with transistor voltage and current regulating means and more particularly it is a protective network for protection against transient overload voltages in the input circuit to a transistor voltage and current regulator and for protection against short circuits in the output of this regulator, which regulator may be of the type more fully shown and described in the patent application of Gerald M. Ford and Byrl Dale Tague, Serial No. 508,004, filed May 12, 1955, and entitled "Direct Current Transistor Voltage or Current Regulators."

With the coming of transistor voltage and current regulators replacing the well-known vacuum tube voltage and current regulators, it is important that the transistors and other elements of the new regulator circuits be protected against damaging high transient voltages or short circuits. While transistors are known to have a considerable factor of safety in passing excessive currents and in handling high voltages, such high currents or voltages may produce excessive heat in the transistor which in itself is exceedingly damaging to transistor elements and may cause them to go out of control or break down completely.

Probably one of the easiest ways to damage a transistor is by passing an exceedingly high current through it as a result of the application of high voltages across the terminals thereof or a short circuit in the system to produce the excessively high current. In the present invention a protective network is utilized at appropriate places in a transistor and voltage regulator circuit to "bleed off" excessive voltages or excessive currents attempting to be applied to or to pass through any of the transistors, thus eliminating damage thereto in any way. The protective network is continuously operative for succeeding cycles of voltage overload or short circuit, the regulator circuit returning to its normal operative condition after each overload or short circuit cycle without the necesssity of any replacement of parts. It is therefore a general object of this invention to provide a transient overvoltage and short circuit protective network in a transistor voltage and current regulator, or the like, which is operative to protect the elements of the circuit and is effective after each cycle of voltage overload or short circuit to return the regulator to normal operating conditions.

These and other objects, advantages, features, and uses will become more apparent as the description proceeds with particular emphasis laid to the constructional features of the protective network when considered in view of the accompanying drawing in which, Figure 1 illustrates a current and voltage regulator circuit incorporating the protective network in schematic circuit diagram, Figure 2 illustrates that portion of the circuit of Figure 1 which is operative to protect the regulator circuit from load shorts, and Figure 3 illustrates that portion of the regulator circuit of Figure 1 which is operative to protect the regulator circuit from transient voltage overloads applied to the input terminals.

Referring more particularly to Figure 1, there is illustrated the input terminals 10 and 11 to a transistor voltage and current regulating circuit to apply regulated voltage and current to output terminals 12 and 13 for a variable load, herein indicated generally by the reference character 14. In the particular illustration shown in Figure 1 the terminal 10 should be the positive terminal which conducts current through the lead 15 to a junction 16 from which an electrical connection is established to the emitter terminal of transistor 18 through a resistor 17 and to the emitter terminal of a transistor 19. The collector of transistor 19 and the base of transistor 18 are coupled in common, the common point being connected through a resistor 20 to the negative lead 21. The emitter and collector of transistor 18 are coupled through a shunt resistor 22. The collector is coupled by way of the current regulating resistor 23 and the lead 24 to the output terminal 12. The collector terminal of transistor 18 is likewise coupled by way of the lead 25 through a temperature compensating resistor 26, through fixed resistors 27 and 28, and through a potentiometer 29 to the negative lead 21. For the purpose hereinafter set forth, a resistor 30 and a capacitor 31 are coupled in series across the positive and negative output leads 24 and 21.

In order to control the current and voltage of the output terminals 12 and 13 by the transistor 18 a sample of the output voltage is needed in order to control the conduction of transistor 18. This is accomplished by two transistors 35 and 36 coupled in a complementary manner, as hereinafter disclosed, to control the base current of transistor 19. The base of transistor 35 is coupled to the movable tap 37 of the potentiometer 29, which movable tap is also coupled through fixed resistors 38 and 39 and a capacitor 40 in series with the emitter of the transistor 36. The emitter of transistor 36 is connected to the negative lead 21 by way of the resistor 41. The collector of transistor 35 is coupled through a resistor 42 to the base of the transistor 36 and also to the junction of resistor 39 and the capacitor 40. A capacitor 43 is coupled in parallel to the resistor 42, and a capacitor 44 is coupled across the emitter and collector terminals of transistor 35. A crystal diode 45, preferably a zener diode, couples the emitter of transistor 35 to the output lead 24 down stream from the current regulating resistor 23 to provide a voltage reference for the transistor 35 in its voltage sampling functions. The voltage reference diode 45 in some cases exhibits a negative resistance characteristic at low temperatures, and for this reason a resistor 46 couples the diode 45 at the junction of the emitter of transistor 35 to the negative lead in order to shift the operating point to a region where the diode 45 would only exhibit positive resistances. The collector of the transistor 36 is coupled directly to the base of transistor 19, whereby the sampling circuit produced by the network of transistors 35 and 36 controls the conduction of transistor 19 which regulates the voltage drop across resistor 20 to control the base voltage and consequently the collector current of transistor 18. The voltage level of the output at 12 and 13 is adjustable by the potentiometer 29.

It may be noted in this illustration that the transistors 18, 19, and 35 are of the P-N-P type and that transistor 36 is of the N-P-N type, the P-N-P transistor 35 and the N-P-N transistor 36 being coupled in a complementary fashion for the voltage sampling circuit. It is to be understood, however, that other combinations of P-N-P and N-P-N transistors may be used in the voltage and current regulator, as more particularly described in the aforementioned patent application of Gerald M. Ford and Byrl Dale Tague.

Although the transistor types may be changed in this voltage and current regulating circuit, the protective network comprising the particular invention herein consists of placing a crystal diode 50, which is preferably a zener diode, in series with a fixed resistor 51, this series network being coupled between the collector of transistor 18 and the common coupling of the base of transistor 19 and the collector of transistor 36. The crystal diode 50 is oriented such that there is low forward resistance for currents to pass from the collector of transistor 18 to the common junction of the base of transistor 19 and the collector of transistor 36 and there is a large back resistance preventing flow of current to the collector of transistor 18. This network of the diode 50 and resistor 51 protects the voltage and current regulator circuit from short circuits across the load terminals, as will be explained hereinafter. Diode means, herein illustrated as being three diodes 52, 53, and 54, preferably zener diodes, are coupled in series across the emitter and collector of the transistor 36. These diodes are all oriented in the same direction, providing a high back resistance for currents from collector-to-emitter of the transistor 36. It may be noted that this protective network provides a series coupling by way of the crystal diode 50, resistor 51, crystal diodes 52, 53, and 54, and the resistor 41 between the output leads 25 and 21 with the base of transistor 19 coupled at the junction of resistor 51 and the series diodes 52, 53, and 54.

Figures 2 and 3, each being merely a portion of the illustrated circuit of Figure 1, will have identical reference characters applied thereto for like parts in Figure 1. Reference will be made to these figures in describing the operation of the invention.

In the normal operation of the voltage and current regulator circuit oscillation is prevented by reason of the capacitors 31, 40, 43, and 44, and the resistors 30, 38, and 42. These circuit elements operate to stabilize the circuit by reducing the high frequency gain without introducing sufficient phase shift to start low frequency oscillation. The emitter-to-base voltage of transistor 35 has a negative temperature coefficient, while the reference voltage diode 45 has a positive temperature coefficient. The net variation is compensated by the voltage drop across the temperature compensating resistor 26 which has a positive temperature coefficient. The transistor 35, diode 45, and resistor 26 should be packaged in such a way that they will all operate at the same temperature. The current compensating resistor 23 is used to compensate, and it is desirable to overcompensate slightly, for the output voltage response as a result of load requirements. If the load current increases, the voltage across the current compensating resistor 23 will increase and the emitter-to-base voltage of transistor 35 will decrease to control the current through transistor 18 to regulate the current and voltage to the load. If the proper value is chosen for the current regulating resistor 23, change of load current will not affect the output voltage at all.

As is well-known in the transistor art, temperature affects the conductive characteristics of transistors, and allowances should be made therefor. Ordinarily collector current increases with temperature. Thus, at high temperature the collector current of transistor 35 might be amplified through the transistors 36 and 19 to such an extent that the transistor 18 could conceivably be cut off, in which case the regulator circuit would be out of control. The resistor 39 shifts the operating point of the transistor 35 in such a way that its collector current is always larger than the maximum leakage current caused by high temperatures. Since the transistor 18 may be required under certain conditions of high load to conduct heavy currents, the shunting or power resistor 22 is placed across the collector and emitter terminals to carry a part of the load. This shunt resistor 22 therefore operates to keep the operating temperature of the transistor 18 at a minimum. This shunt resistor would create a problem without the resistor 17 since it is conceivable that the shunt resistor may carry all of the load when the transistor 18 is cut off. When the emitter-to-base voltage of transistor 18 is zero, this transistor is cut off, which means that the emitter-to-collector voltage of transistor 19 is also zero. Since the transistor 19 cannot pass any collector current to cut off transistor 18 without emitter-to-collector voltage, the resistor 17 is placed between the emitters of transistors 18 and 19 to always produce this necessary voltage drop.

In the operation of the voltage and current regulator, let the operation first be considered to the exclusion of the protective network. As the voltage tends to rise on the output terminals 12 and 13, indicating a reduced load current, the voltage difference across the voltage reference diode 45, indicated herein by $V_1$, and the voltage between the collector of transistor 18 and the movable tap, indicated herein by $B_2$, increases, producing an increase of voltage on the base of transistor 35, thereby increasing the base current. This voltage difference is produced in part by the voltage drop across the current compensating resistor 23, herein referred to as $V_4$, since this resistance is in the comparison loop. The increase in base current in transistor 35 produces an increase in collector current, which increases the base current of transistor 36. An increase in base current of transistor 36 produces an increase in collector current of this transistor, which likewise produces an increase in base current of transistor 19. An increase in base current of transistor 19 produces an increase in collector current of transistor 19, thereby increasing the voltage drop across resistor 20, herein indicated by $V_3$. This increase in the voltage drop across resistor 20 increases the base voltage of transistor 18, whereby the base voltage of transistor 18 approaches the emitter voltage, thus reducing the base current and consequently reducing the collector current to the load. This reduction of collector current in transistor 18 reduces the current to the load in the proper amount to hold the voltage across the load, represented by $V_0$, to a predetermined level. Thus, for all conditions where the voltage on the leads 21 and 24 tend to increase by reason of a decrease in current demanded by the load, a sampling circuit consisting of the network of transistors 35 and 36 in complement vary the conduction of transistor 19 and consequently attenuate the conduction of transistor 18. In like manner any increase in load demands requiring an increase in current to the load tending to reduce the voltage $V_0$ will reduce the voltage difference between $V_1$ and $V_2$ to reduce the collector conduction of transistors 35, 36, and 19 to reduce the voltage of $V_3$. This reduction in voltage $V_3$ will produce a greater emitter-to-base voltage in transistor 18, causing an increase in collector current to the load to maintain the voltage $V_0$ at the predetermined level.

In the operation of the protective network let it be assumed that a short circuit is placed across the output leads 21 and 24 of the voltage and current regulator device. Referring more particularly to Figure 2, a portion of the circuit in operation is shown herein wherein an excessively high current demand is made of the transistor 18. The portion of the circuit not shown is actually shorted out and rendered ineffective, and therefore will not be considered in Figure 2. The excessive current demand in the load reduces the voltage difference between $V_1$ and $V_2$, which reduces the collector conduction in transistor 35, 36, and 19, causing a large voltage difference across the crystal diode 50 and the resistor 51; that is, the collector voltage of transistor 18 falls with respect to the base voltage of transistor 19. For a short circuit, this voltage difference would rise to a point where the back resistance of the crystal diode 50 would break down, allowing conduction back to the collector, establishing a large collector current in transistor 19 to produce a high voltage on the base of transistor 18 whereby transistor 18 is cut off. This operation renders the voltage regulator inoperative as long as the short exists, but as soon as the short is removed the regulator will resume its normal voltage and current regulating characteristics without damage to any of the parts and without the necessity of replacing any parts.

In the event the input voltage $V_1$ becomes excessively high to a point predetermined by the back resistance breakdown point of the crystal diodes 52, 53, and 54, these crystal diodes will operate to protect the voltage and current regulator against damage. Referring more particularly to Figure 3, wherein a portion of Figure 1 is reproduced which shows only the part of the circuit which is operative under high transient voltage conditions, the base voltage of transistor 19 will become so high as to cause a breakdown of the back resistance of the diodes 52, 53, and 54 wherein the high voltage will be "bled off" through the diodes 52, 53, and 54 and the resistor 41 to ground. A portion of this "bleed off" will also be by currents through the resistor 51 and the crystal diode 50. The breakdown of the crystal diodes causes the transistors 35 and 36 to lose control of the circuit entirely, and these transistors will remain inactive so long as the transient or excessive voltages persist. While it is true that the transistor 19 will be conducting heavily, this conduction is not sufficient to cause damage to this transistor, this conduction only being sufficient to completely cut off the conduction of transistor 18.

As may be seen from the above description of operation, the voltage and current regulator of Figure 1 will always be protected from any excessive load current demands or short circuits as well as from high transient voltages applied as the input to this circuit. By way of example, where such a voltage and current regulator as shown in Figure 1 is used in an aircraft and accessible to the 28 volt direct current source of the aircraft, such voltage sources are known to have had transient voltages as high as 80 volts. If the crystal diodes 52, 53, and 54 are selected to break down in the back resistance direction at, for example, 36 volts, all operation of the voltage and current regulator will be cut off whenever a transient voltage goes above 36 volts.

While many modifications and changes may be made in the constructional circuit details without departing from the invention, as by using equivalent elements and particularly equivalent elements in the protective network, it is to be understood that I desire to be limited only by the scope of the appended claims.

I claim:

1. A transient overload and short circuit protective network for semi-conductor voltage and current regulator devices having a first semi-conductor with the emitter and collector thereof coupled in series from input to output in one lead of a direct current voltage supply line to a load, a second semi-conductor with the emitter and collector thereof coupled across the emitter and base of the first semi-conductor, and a voltage sampling circuit coupled between the output of said first semi-conductor and the base of the second semi-conductor for controlling the current through the first semi-conductor, the invention which comprises: first and second unidirectional current means each having a low resistance in the forward direction and a high resistance in the back direction coupled in a network with said first and second unidirectional means each in series relation and each in opposite directions joining at a junction, the network being coupled between the output terminal of the first semi-conductor and the other lead of the voltage supply line; and the base of the second semi-conductor coupled to said junction whereby short circuits at the load and high transient voltages in the voltage supply line will cause the back resistance of the unidirectional means to be exceeded to cut off conduction of the first semi-conductor means.

2. A protective network as set forth in claim 1 wherein said network includes a resistance serially coupled with each said unidirectional current means on each side of said junction whereby the currents in the back direction through each unidirectional means are limited.

3. A protective network as set forth in claim 2 wherein each unidirectional current means is a zener diode.

4. A transient overload and short circuit protective network for semi-conductor voltage and current regulator devices having a first semi-conductor with the emitter and collector thereof coupled in series from input to output in one lead of a direct current voltage supply line to a load, a second semi-conductor with the emitter and collector thereof coupled across the emitter and base of the first semi-conductor, and a voltage sampling circuit coupled between the output of said first semi-conductor and the base of the second semi-conductor for controlling the current through the first semi-conductor, the invention which comprises: a diode and a resistance coupling the output of said first semi-conductor and the base of the second semi-conductor; and a plurality of diodes in serial relation coupled in series with a resistor between the base of the second semi-conductor and the other of the leads of the voltage supply line, said plurality of diodes being in the same polarity direction, the polarity relation of said first-mentioned diode with respect to said plurality of diodes being opposed whereby short circuits at the load will cause a low voltage on the collector of the first semi-conductor with respect to the voltage on the base of the second semi-conductor to overcome the back resistance of said first-mentioned diode, and a high transient voltage in the supply voltage line will overcome the back resistance of said plurality of diodes, each condition of which will operate to cut off the first semi-conductor.

5. A protective device as set forth in claim 4 wherein the semi-conductors are transistors and said diodes are zener diodes.

6. A transistor overload and short circuit protective network for transistor voltage and current regulator devices having a first transistor with the emitter and collector thereof serially coupled to the input and output terminals, respectively, of one lead of a direct current voltage supply line to a load, a second transistor with the emitter and collector thereof coupled to the emitter and base, respectively, of the first transistor, and a pair of transistors in complement, the first of which samples the output voltage of the first transistor and the last of which is serially coupled by its emitter and collector between the base of the second transistor and the other lead of the supply line, the invention which comprises: a crystal diode and a resistor coupled in series between the output terminal of the first transistor and the base of the second transistor for producing a conduction cutoff of the first transistor as a result of a short across the output to the load, and crystal diode means coupled across the emitter and collector of the last of the complementary transistors for producing a conduction cut-off of the first transistor as a result of high transient voltages applied to the input terminals of the first transistor whereby the regulator circuit is protected against damage.

7. A protective network as set forth in claim 6 wherein said diodes are zener diodes all of which are oriented with their characteristics of least resistance toward the base of the second transistor.

No references cited.